No. 841,693. PATENTED JAN. 22, 1907.
J. KNOWLES.
CATTLE GUARD.
APPLICATION FILED OCT. 15, 1906.
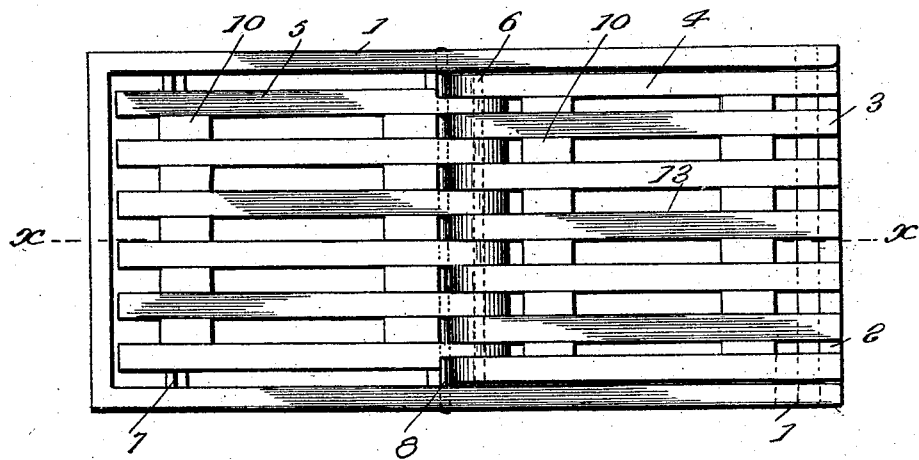
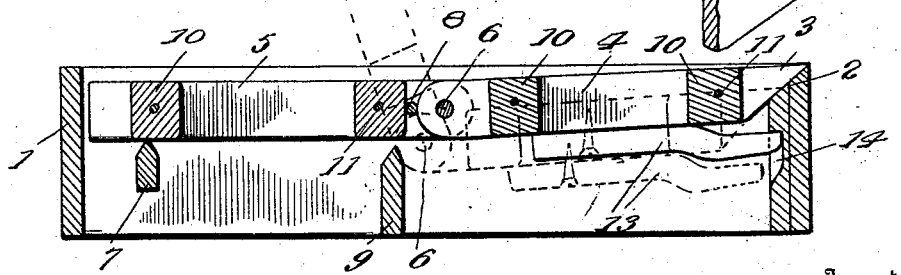
Inventor
J. Knowles

UNITED STATES PATENT OFFICE.

JOSEPH KNOWLES, OF EDMONDS, WASHINGTON.

CATTLE-GUARD.

No. 841,693.     Specification of Letters Patent.     Patented Jan. 22, 1907.

Application filed October 15, 1906. Serial No. 339,028.

*To all whom it may concern:*

Be it known that I, JOSEPH KNOWLES, a citizen of the United States, residing at Edmonds, in the county of Snohomish and State of Washington, have invented certain new and useful Improvements in Cattle-Guards, of which the following is a specification.

This invention aims to devise a novel form of guard to prevent stock from passing upon the track of a railroad at a crossing or other way leading across said track and which guard will admit of an animal passing freely from the track without offering the slightest impediment or tending to frighten the animal.

For a full description of the invention and the merits thereof reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a top plan view of a cattle-guard for railroads constructed in accordance with the invention. Fig. 2 is a longitudinal section of the guard on the line *x x* of Fig. 1, the full lines showing the normal position of the sections and the dotted lines indicating the guard-section elevated and the depressible section lowered. Fig. 3 is a detail view showing more clearly the antifriction-roller interposed between the inclined or beveled ends of the depressible section and frame. Fig. 4 is a detail perspective view of the end portion of the frame provided with the notch to receive the projecting end of the lock-bar and with the roller.

Corresponding and like parts are referred to in the following description and indicated in all the views of the drawings by the same reference characters.

The device comprises a frame 1, which is of a size depending upon the required length of the guard and depressible sections. The frame 1 may be of any substantial formation and constructed of suitable material which will assure the provision of a substantial and effective appliance. The upper edge of the end piece of the frame adjacent to the crossing is beveled or inclined, as indicated at 2, and coöperates with an oppositely beveled or inclined end 3 of the depressible section 4 of the guard.

The guard comprises the depressible section 4 and an elevating-section 5, the two sections having their inner or opposing ends pivotally connected by means of a rod 6, the same passing through registering-openings in knuckles or overlapped ends of the bars comprising the respective sections. The sections are supported in normal or horizontal position by means of a bar 7, rod 8, and the beveled end 2 of the frame 1. The upper edge of the bar 7 is oppositely beveled to an edge, thereby preventing the lodgment of dirt or foreign matter thereon. The pivot-rod 8 passes through registering openings of the bars forming the elevating-section 5 and is supported at its ends in openings provided in the side pieces of the frame. An intermediate cross-bar 9 is secured at its ends to the side pieces of the frame 1, and its top edge is beveled to prevent foreign matter lodging thereon and is located a slight distance from the lower side of the guard to limit the downward movement of the depressible section 4 and in conjunction with the beveled end 2 supports said depressible section when lowered. The pivot-rod 8 is located a short distance from the rod connecting the inner ends of the sections 4 and 5.

Each section of the guard is of similar formation, consisting of longitudinally-disposed bars spaced apart and having filling-blocks 10 interposed between them and located a short distance from the extremities of said bars. Tie-rods 11 pass through registering openings in the respective bars and the filling-blocks and hold the same in fixed position.

When weight is placed upon the depressible section, the same descends and effects a corresponding lowering of the inner end of the elevating-section 5, with the result that said section is thrown upward. During the downward movement of the depressible section 4 its end 3 rides upon the beveled end 2 of the frame.

In order to reduce the friction between the beveled or inclined ends 2 and 3 to the smallest amount possible, a roller 12 is interposed between the same and may be fitted to each projecting end of the bars or may be applied to the beveled end 3, as found most advantageous.

It is proposed to place a device substantially as herein set forth between the tracks and at each side of the tracks. An animal upon the tracks may pass therefrom without being hindered by the appliance, since weight placed upon the elevating-section 5 does not tend to operate the device, but after the animal clears the section 5 and passes upon the depressible section 4 the latter sinks and prevents the return of the animal upon the track, as will be readily comprehended.

To prevent lifting of the depressible section at its outer end, the same is provided with a lock-bar 13, adapted to enter the notch 14 in the inner side of the end piece of the frame provided with the beveled or inclined edge 2. Under normal conditions—that is, when the elevating and depressible guard-section are in horizontal position—the outer end of the lock-bar 13 extends into the notch 14, but when the depressible section is lowered the lock-bar is withdrawn from engagement with the notch 14, thereby releasing the depressible section and permitting its outer end to be elevated should it be required to gain access to the appliance beneath the depressible section either for removing accumulations or for other purposes. The lock-bar 13 may be pivoted to the depressible section so as to be turned aside, if desired.

Having thus described the invention, what is claimed as new is—

1. In a cattle-guard for railways, the combination of an elevating-section pivoted near one end, a depressible section pivoted at its inner end to the projecting end of the elevating-section a short distance from its pivotal support, the outer end of the depressible section being inclined, and a correspondingly-inclined support for the outer end of the depressible section.

2. In a cattle-guard, the combination of similarly-formed sections, each comprising a series of spaced bars, the inner ends of the bars of said sections overlapping and having pivotal connection, a pivot-support for one of the sections located a short distance from the pivot connection of the two sections, and an inclined support for the outer end of the other section.

3. In a cattle-guard for railways, the combination of a rectangular frame, having the upper edge of an end piece beveled or inclined, cross-bars supported at their ends in the side pieces of the said frame and having their upper edges oppositely inclined, the intermediate cross-bar having its top edge spaced a short distance from the bottom side of the guard-sections when in horizontal position, guard-sections having knuckles at their inner ends and pivotally connected, the outer end of the depressible section being beveled to correspond to the inclination of the beveled edge of the inclined end piece of the frame, and a rod pivotally supporting the elevating-section a short distance from its pivoted connection with the depressible section.

4. In a cattle-guard, the combination of a frame having an end piece provided with a notch, elevating and depressible guard-sections pivotally connected and having pivotal connection with said frame, and a lock-bar applied to the outer end of the depressible section and normally extending into the said notch to interlock with the frame and adapted to be withdrawn when the depressible section is lowered.

In testimony whereof I affix my signature in presence of two witnesses.

JOSEPH KNOWLES. [L. S.]

Witnesses:
JOHN NORMAN,
CHAS. PETERSON.